(12) United States Patent
Malamut et al.

(10) Patent No.: US 11,522,914 B1
(45) Date of Patent: Dec. 6, 2022

(54) PEER-BASED POLICY DEFINITIONS

(71) Applicant: EMC IP Holding Company LLC, Hopkinton, MA (US)

(72) Inventors: Mark D. Malamut, Aliso Viejo, CA (US); Adam Brenner, Mission Viejo, CA (US); Arun Murti, Mission Viejo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 264 days.

(21) Appl. No.: 16/597,288

(22) Filed: Oct. 9, 2019

(51) Int. Cl.
*H04L 9/40* (2022.01)

(52) U.S. Cl.
CPC .............. *H04L 63/20* (2013.01); *H04L 63/04* (2013.01); *H04L 63/102* (2013.01); *H04L 63/108* (2013.01)

(58) Field of Classification Search
CPC ........ H04L 63/20; H04L 63/04; H04L 63/102
USPC ............................................................ 726/1
See application file for complete search history.

(56) References Cited

U.S. PATENT DOCUMENTS

| | | | |
|---|---|---|---|
| 2019/0012743 A1* | 1/2019 | Resutek | G06Q 10/10 |
| 2019/0370495 A1* | 12/2019 | Chen | G06F 17/18 |
| 2019/0370707 A1* | 12/2019 | Liu | G06K 9/6223 |
| 2019/0394238 A1* | 12/2019 | Putz | G06N 3/08 |

* cited by examiner

*Primary Examiner* — Anthony D Brown
(74) *Attorney, Agent, or Firm* — Dergosits & Noah LLP; Todd A. Noah (57) ABSTRACT

Described is a system for a Policy Derivation Engine (PDE) that, when accessed by one or more organizations, assists such organizations in updating and managing data protection policies based on external policy updates from one or more other organizations that share the same organizational peer group. The system receives a policy request from a first computing system associated with a first organization. The system computes a list of peer organizations of the first organization. The system builds policy update data based on respective policy data received from one or more peer organizations and transmits at least a portion of policy update data to the first computing system associated with the first organization.

14 Claims, 4 Drawing Sheets

PEER-BASED POLICY DEFINITIONS

TECHNICAL FIELD

This disclosure relates to data protection, and more particularly, collecting and aggregation of policies from one or more organizations.

BACKGROUND

The ongoing challenge of protecting data environments requires that an organization deploy various policies to manage and schedule the protection of data that also complies with various rules and regulations. In current conventional systems, in order to protect data, administrators must manually develop complex and specific data protection tasks that define exactly when and how various data sources (i.e. machines, virtual machines, applications) are protected. Development and oversight of the such data protection tasks is cumbersome and time intensive in order to stay in alignment with the requirements of, for example, a desired service level objection (SLO), a service level agreement (SLA), corporate governance policies and/or governmental regulations. To that end, defining data protection policies requires the identification of correct policy attributes such as recovery point objection (RPO), recovery time objection (RTO), data retention period, replication, etc., for various asset types and/or application tiers. This brings about an ongoing tension between an organization's desire to implement efficient approaches to data protection systems in order to avoid consuming more resources than necessary while at the same time insuring, they meet minimum SLO/SLA requirements. An additional constraint is provided by various legal and compliance regulations (e.g., Sarbanes-Oxley) across an industry that will dictate certain attribute values. A layer of complexity is further added when one realizes that legal and compliance regulations often change over time.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method and computer program product) for system for Policy Derivation Engine (PDE) that, when accessed by one or more organizations, assists such organizations in updating and managing data protection policies based on external policy updates from one or more other organizations that share the same organizational peer group. Such data protection policies may be utilized for protecting server data or application data. For example, the data protection may protect file system data or database data or data of a word processing application. The system receives a policy request from a first computing system associated with a first organization. The system computes a list of peer organizations of the first organization. The system builds policy update data based on respective policy data received from one or more peer organizations and transmits at least a portion of policy update data to the first computing system associated with the first organization.

In some embodiments, the PDE exchanges data protection policy data with computer systems of various organization that have chosen to subscribe to the PDE so that those computer systems ("subscriber systems") will receive smarter and more current data protection policy updates over time. A smarter policy update may be defined as current policy data as to various criteria, such as industry sector and geo-region. Initially, the PDE may be seeded with various data protection policies received from various data protection vendors. The initial, seeded policies may not be specific as to any industry sector classification code or geo-region. Subscriber systems will have their policies sent automatically to the PDE, where such policies are flagged as "public" at a subscriber system. Policy data sent from the subscriber systems may be anonymized prior to submission to the PDE, so as to ensure secure transmission. Policy data sent from a subscriber system may also include data associate with SLO, RPO, industry sector classification and geo-region. In order to receive policy update data, a subscriber system may send a request to the PDE that may include an industry sector classification code and geo-region identifier. In response to the request, the PDE may search for a sufficient of policy data that is associated with the industry sector classification code (or a truncated version of the industry sector classification code) and applicable to the received geo-region identifier. The sufficient amount of policy data may be further curated down to a subset of policy data, and policy data for the requesting subscribe system may be derived based on the subset of policy data and sent back to the requesting subscribe system for implementation at the requesting subscribe system.

In some embodiments, in response to a request from an organization (i.e. "subscriber system") for policy data (i.e. templates, rules, definitions, attributes, values, instructions, requirements, etc.), the PDE may compute one or more organizational lists that include a listing of organizations that are considered peers to each other and the requesting organization due the respective organizations having a similar industry identification code. For example, an industry identification code may be a North American Industry Classification System (NAICS) code. In another example, industry identification code may be based on Standard Industrial Codes ("SIC codes"). It is understood that the industry identification code is not limited to being based on the NAICS code and the SIC codes.

An organization is not limited to receiving policy updates from the PDE solely based on policies from the organization's peer group. An organization may also access the PDE in order to request policy updates that are deployed in an industry that is different than the industry identified by the organization's NAICS code. For example, an organization may have an NAICS code that maps to a technology sector, but since that organization has substantial needs for templates and updates for policies to protect data from its human resources and finance division, the organization may instead send requests to the PDE for policy updates from an organizational peer group whose industry sector may be in better alignment with the policy needs of the human resources and finance division—as opposed to requesting policy updates from other technology companies that share a similar NAICS code and same industry sector. In an embodiment, an organization may have a set of servers ("HR servers") dedicated to supporting its Human Resources division and another set of servers ("Finance servers") dedicated to supporting its Finance division. The organization may send a first request to the PDE for policy data that identifies an industry sector that is associated with data protection policies for Human Resources and the first request will request policy update data for the HR servers. The organization may also send a second request to the PDE for policy data that identifies a different industry sector that is associated with data protection policies for Finance and the second request will request policy update data for the Finance servers. The industry sectors identified in the first and second request are different from each other—and those industry sectors may also be different than an identification of an industry sector that describes the actual industry sector of the organization. Upon receiving a request for policy update data, the PDE computes a response based at least on policy data received from one or more of the organizations in a computed organizational list. It is further understood that a policy update may be any portion of one or more policies stored and managed by the PDE—and may be an entire policy stored and managed by the PDE as well.

In some embodiments, the PDE uses an approach of truncating various portions of an industry identification code included in a policy data request in order to identify a meaningful set of policy updates to be sent in response to the policy data request. For example, a received industry identification code may include six digits. Searching for policy updates in an organization peer group that is associated with a matching six-digit code may result in an amount of policy data that is less than a policy data threshold. The PDE may then truncate the received industry identification code down to five digits and execute a second search for policy updates based on an organization peer group that is associated with a matching five-digit code. If the result of the second search still identifies an amount of policy data that is less than the policy data threshold. Additional truncation may be required down to four or three digits until a search identifies an amount of policy data that satisfies the policy data threshold. Once the proper amount of policy data is identified, the PDE performs an analysis on that policy data to identify a subset of policy data that best matches the policy data request.

Figure 1:
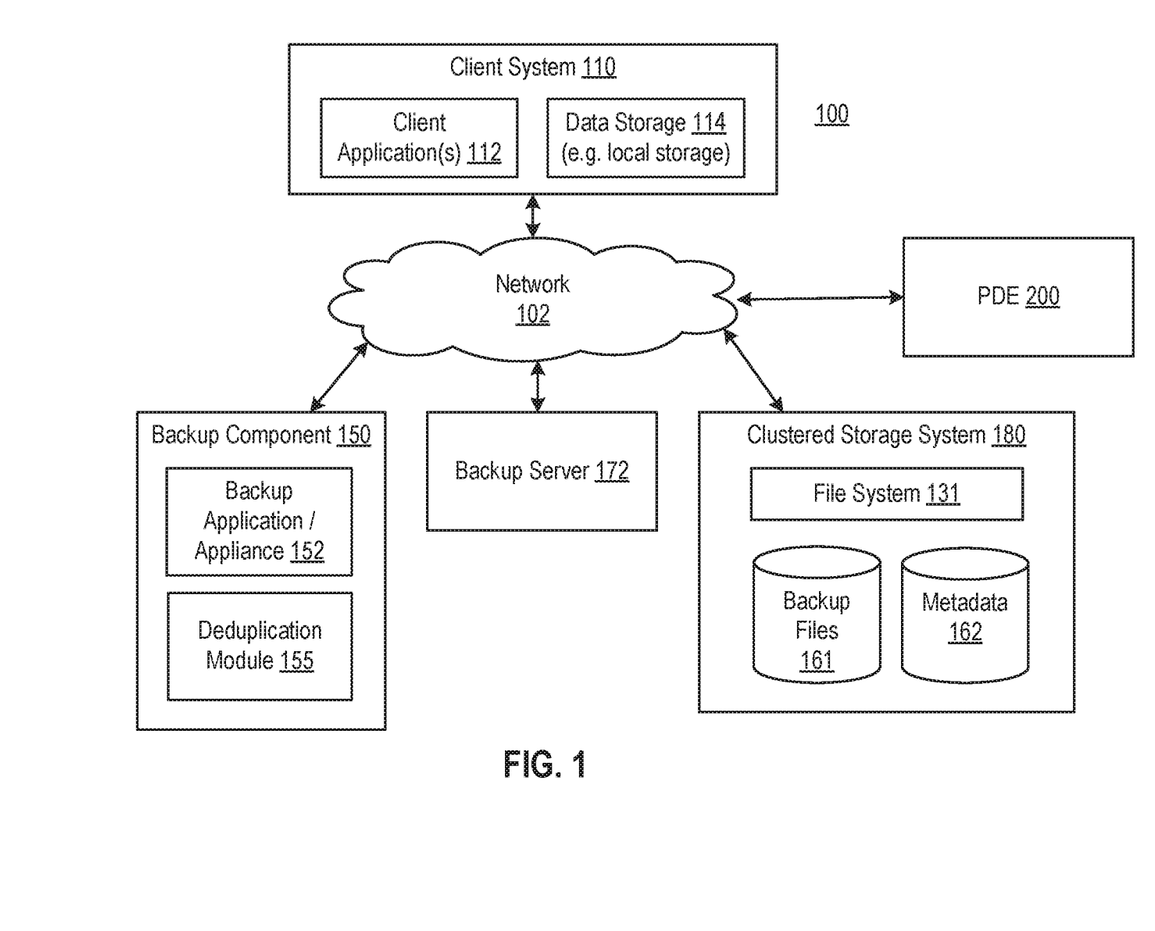
FIG. 1 is a block diagram illustrating an example operating environment of a Policy Derivation Engine and/or an example operating environment in which one or more data protection policies may be deployed by an organization according to one or more embodiments of the disclosure.

In some embodiments, a computing system of an organization that accesses the PDE 200 may be provided within an operating environment. For example, the PDE may be deployed with respect to various types of data protection environments, such as the Dell EMC™ Corp. Data Protection Suite. Another example of such an operating environment is further described herein with reference to FIG. 1. However, in general, it is understood that embodiments of the disclosure directed at systems of one or more organizations or the PDE itself may include and/or be implemented (as shown in FIG. 1) in an operating environment including a cloud services environment that may be, or include, a data protection operating environment and a backup and clustered storage environment. For example, at least some functionality may be provided by, or implemented in connection with, various platforms for data protection platform provided by Dell EMC™ Corporation, and associated systems, methods, and components, although use of this particular platform is provided only by way of illustration and is not required.

In some embodiments, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as other types of data stores. The applications on the clients may generate new and/or modified data that is desired to be protected.

Any of the devices (or systems, virtualized systems), including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the term "backup" (or "data backups," "backed-up data," etc.) is intended to be construed broadly and includes, but is not limited to, partial backups, incremental backups, full backups, clones, snapshots, any other type of copies of data, and any combination of the foregoing. Any of the foregoing may, or may not, be deduplicated. In addition, the storage of data can employ any suitable storage technique, infrastructure, hardware (e.g. Solid State Drive (SSD), Hard Disk Drive (HDD)), or on virtual storage systems provided by a cloud service provider, etc.

As shown in FIG. 1, the environment 100 may include a client system 110, backup system 150, backup server 172, and a clustered storage system 180. It should be noted that the components of operating environment 100 may interact via a network 102, which may be any type of wired or wireless network including a local area network (LAN), a wide area network (WAN), or a direct communication link, or other suitable connection.

As shown, the operating environment 100 may include a client or client system (or computer, or device) 110 that may be associated with a client or customer of a data backup and protection service, and a backup system 150 that may be associated with a data backup and protection service provider. For example, the client system 110 may provide computing resources (e.g. webservers, databases, etc.) for users (e.g. website visitors) of the customer, data from which may be protected by the backup and data protection service provider. Accordingly, the client system 110 may act as a client from which backups are performed. In some embodiments, the client system 110 may comprise a virtual machine. In addition, the client system 110 may host one or more client applications 112, and may include data storage 114, as well as an interface for communicating with other systems and devices, such as the backup system 150. In general, the client applications 112 may create new and/or modified data that is desired to be protected. As such, the client system 110 is an example of a host device. The data storage 114 can be used to store client data, which may, along with the client system 110 (e.g. client applications 112) may be backed up using the backup system 150. As further described herein, components of the client system 110 (e.g. client applications, 112, data storage 114, etc.) may be a data source, or be associated with, one or more data sources such as a database, VM, storage device, etc. In addition, components of the client system 110 may be data sources that are associated with the client system 110, but reside on separate servers such as a data server, or a cloud-computing infrastructure. The client system 110 may include a backup client application, or plug-in application, or API that cooperates with backup system 150, to create backups of client data. The backed-up data can also be restored to the client system 110.

In one embodiment, backup component 150 may represent one or more components of a Data Domain Restorer (DDR)-based deduplication storage system, and backup server 172 may be implemented in conjunction with a Data Domain deduplication storage server provided by Dell EMC for use with DDR storage devices. For example, the backup server 172 may be a stand-alone entity, or can be an element of the clustered storage system 180. In some embodiments, the backup server 172 may be a Dell EMC Avamar server or a Dell EMC Networker server, although no particular server is required, and other backup and storage system configurations are contemplated.

The backup component 150, may include a backup application (or appliance) 152 that performs (or manages, coordinates, etc.) the creation and restoration of data that may be backed-up. For example, data to be backed-up from the client system 110 may be communicated from the client system 110 to the backup application 152 for initial processing, after which the processed data is uploaded from the backup application 152 for storage at the clustered storage system (e.g. as backup data 161). In some embodiments, the backup application 152 may cooperate with a backup client application of the client system 110 to back up client data to the clustered storage system 180. A backup application 152 may also cooperate with a backup client application to restore backup data from the clustered storage system 180 to the client system 110. In some embodiments, the backup application 152 may be a part of, or work in conjunction with, a storage appliance. For example, the storage appliance may include a Dell EMC CloudBoost appliance, although any suitable appliance is contemplated. In addition, the backup application 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the backup application 152 may be performed using deduplication logic via deduplication module 155. For example, the deduplication module 155 can provide data segmentation, as well as in-flight encryption as the data is sent by the storage application 152 to the clustered storage system 180. However, as further described herein, in some embodiments, data deduplication may be performed entirely within the clustered storage environment 180. It should be noted that the backup application (or storage appliance) 152 can be implemented in various forms, such as a virtual, physical, or native public cloud appliance to fit the requirements of a particular configuration, and the backup application 152 can be used with various types of data protection environments, including public and private object storage clouds.

The clustered storage system 180 (as further described herein) may store backup files 161 (or backup objects) within a one or more nodes (as further described herein). As shown, the clustered storage system 180 may also store metadata 162 for (or associated with) the backup files 161, and one or more instances of a filesystem 131 that catalogs backup files and other data residing in the clustered environment. In general, the storage of backup files 161 may be configured to store client system 110 data backups that can be restored in the event of a loss of data. It is understood that the PDE is not limited to be deployed with respect to storage environments.

Figure 2:
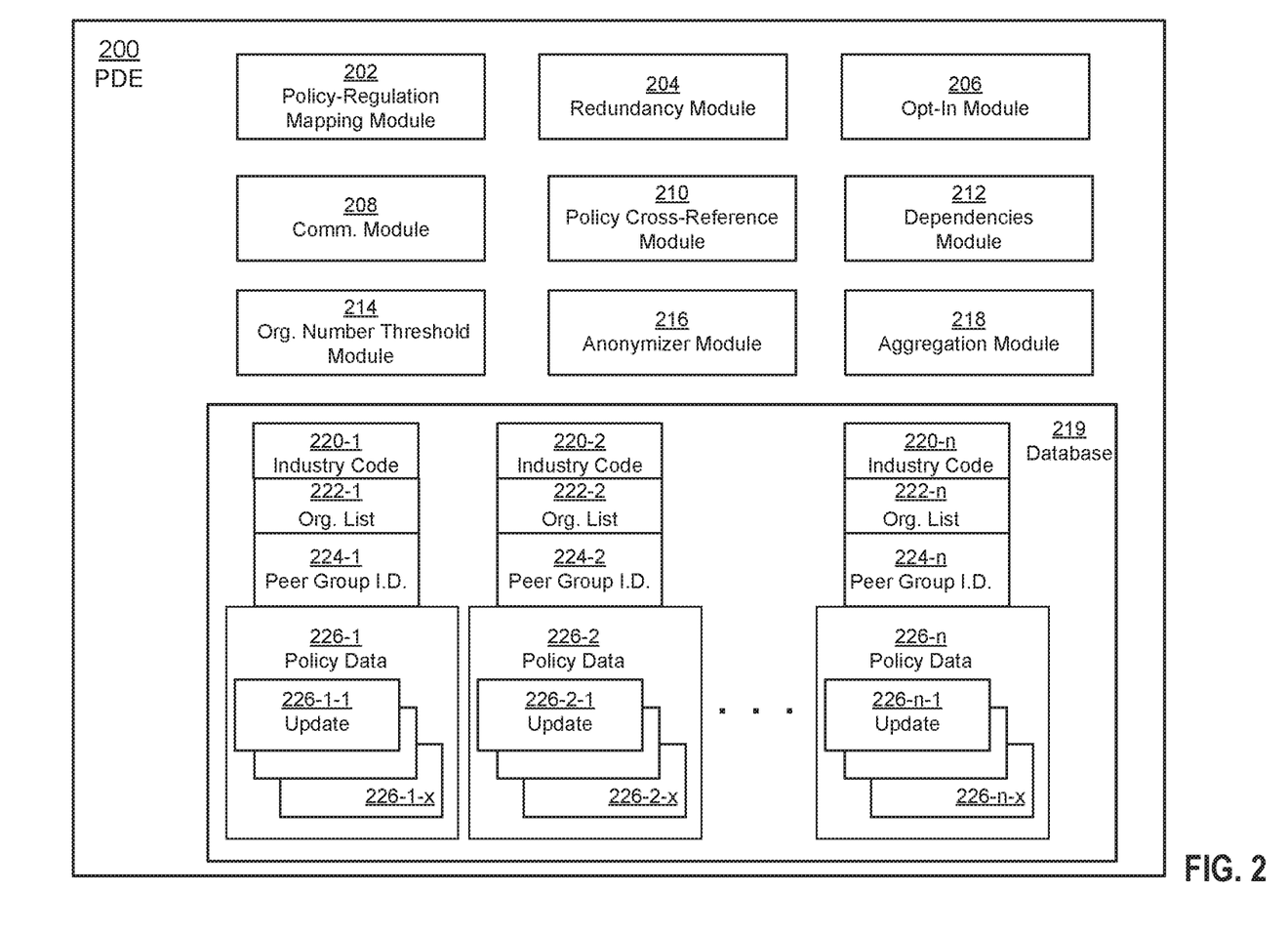
FIG. 2 is a block diagram illustrating an example environment for a Policy Derivation Engine (PDE) that updates and manages data protection policies based on external policy updates from one or more other organizations that share the same organizational peer group according to one or more embodiments of the disclosure.

FIG. 2 is a block diagram illustrating an example environment for a Policy Derivation Engine (PDE) 200 that updates and manages data protection policies based on external policy updates from one or more other organizations that share the same organizational peer group according to one or more embodiments of the disclosure.

According to an embodiment, as shown in FIG. 2, the PDE 200 automatically and intelligently assigns data protection policies to various classes of assets. The PDE 200 receives policy data requests and policy update data from one or more external computing systems of different organizations. For example, a first computing system of a first organization (i.e. company) may submit policy update data to the PDE 200, whereby the submitted policy update may be subsequently anonymized and aggregated and later pushed out to one or more peer organizations related to the first organization. The policy update data may be accompanied by one or more industry code identifiers (one or more industry code identifier portions) that indicates at least one industry sector associated with the first organization. For example, an industry identification code may be based on a North American Industry Classification System (NAICS) code.

An anonymizer module 216 translates the policy update data received from the first organization module into an anonymous version of the policy update data. Such anonymized and aggregated policy data will be used by the PDE 200 to derive a manageable set of policies in total per organizational peer group. For example, the anonymizer module 216 may extract organization-specific terms or genericize certain portions of the policy update data with default terms or settings. The organization-specific terms may be submitted by the first organization and stored by the anonymizer module 216 in a keyword list against which policy update data submission can be reviewed. In another embodiment, the anonymizer module 216 may implement a machine learning algorithm to learn organization-specific terms/attributes and/or industry sector-specific policy terms/attributes in order to distinguish which portions of received policy update data are to be anonymized. In an embodiment, the PDE 200 may send instances of the anonymizer module 216 to the computer systems of various organization to be installed at those computer systems. An anonymizer module situated at an organization's computing system thereby allows data to be anonymized before an organization transmits any data to the PDE 200.

Continuing with FIG. 2, an aggregation module 218 receives the anonymized policy update data and the received industry code identifier(s). The aggregation module 218 may access a database 219 to search for industry codes 220-1, 220-2 . . . 220-*n* that map to the received industry code identifier(s). Each industry code 220-1, 220-2 . . . 220-*n* corresponds to a particular organization list 222-1, 222-2 . . . 222-*n* and a particular peer group identifier 224-1, 224-2 . . . 224-*n*. Each peer group identifier 224-1, 224-2 . . . 224-*n* corresponds to specific policy data 226-1, 226-2 . . . 226-*n*—which further includes respective policy updates 226-1-1 . . . 226-1-*x*, 226-2-1 . . . 226-2-*x* . . . 226-*n*-1 . . . 226-*n*-*x* received from various other organizations. It is understood that the pairing of an organization list with a peer group identifier results in a list of peer organizations.

For example, if a portion of the received industry code identifier(s) matches an industry code 220-2, the aggregation module 218 accesses a corresponding organization list 222-2 to determine whether the first organization is listed in the organization list 222-2. An organization list 222-1, 222-2 . . . 222-*n* identifies each organization that belongs to a specific organizational peer group, where each organizational peer group has its own peer group identifier 224-1, 224-2 . . . 224-*n*. If the first organization is listed in a respective organizational list 222-2, the aggregation module 218 includes the anonymized policy update data as one or more updates 226-2-1 . . . 226-2-*x* of the corresponding policy data 226-2.

However, if the aggregation module 218 does not find the first organization listed in any organization list 222-1, 222-2 . . . 222-*n* associated with received industry code identifier(s), this may indicate that the first organization is submitting policy data that relates to policy issues outside of its specific industry sector. If so, the anonymized policy update data may be flagged to indicate that it may not reflect the most recent and up-to-date industry best practices. Nonetheless, the aggregation module 218 may identify which peer group 224-1 that is associated with an industry code 220-1 that matches the received industry code identifier(s). The aggregation module 218 may then include the flagged, anonymized policy update data as one or more updates 226-1-1 . . . 226-1-*x* in the policy data 226-1 of the identified peer group 224-1.

It is understood that, according to some embodiments, one or more of the policy data 226-1 . . . 226-*n*, one or more of organization lists 222-1 . . . 222-*n* and one or more of the peer group identifiers 224-1 . . . 224-*n* may be computed in response to a request for policy update data received from an external computer system of an organization(s). Stated differently, one or more aspects as shown in FIG. 2 may be executed in "real-time" in response to receipt of one or more requests for policy update data. In an embodiment, the aggregation module 218 may build (i.e. compute) an organization list that includes one or more organizations associated with an industry code(s) related to an industry code(s) received in a policy request. The aggregation module 218 may instantiate a peer group identifier for the newly-built organization list, thereby establishing a group of peer organizations relevant to the received policy request and/or relevant to the organization that sent the policy request. The PDE 200 may link anonymized policy update data to the established group of peer organizations. In another embodiment, the anonymizer module 216 may be triggered by the PDE 200 to generate anonymized policy update data that can then be linked to the established group of peer organizations. At least a portion of the newly-generated anonymized policy update data that is relevant to the policy request may be transmitted from the PDE 200 back to the organization that sent the policy request. It is understood that, according to one or more embodiments, the PDE 200 may further trigger execution of any of the aspects illustrated in FIG. 2 in response to the receipt of policy request sent from the first organization.

As further shown in FIG. 2, a redundancy module 204 may review the updates 22-1-1 . . . 226-*n*-*x* in the aggregated policy data 226-1, 226-2 . . . 226-*n* in order to identify redundant data. For example, redundancy module 204 may determine that multiple policy updates are similar in policy data 226-2. In that case, the policy data 226-2 may not need to store multiple copies of the same type of policy update. The redundancy module 204 may delete some of the copies of the redundant policy update. In doing so, the redundancy module 204 may determine if such copies were all received within a recent period of time. If so, such recent receipt of multiple instances of the same type of policy update for an organizational peer group may be an indication that an important, industry-wide issue has forced multiple organizations to make the same policy updates. The redundancy module 204 may assign the retained copy of redundant policy update a high priority so that it is pushed out to all organizations in the organization list 222-2 who have not already submitted that type of policy update.

A dependencies module 212 may build one or more policy data schemas for each collection of aggregated policy data 226-1, 226-1 . . . 226-*n*. For example, an organization may submit a policy update 226-1-x for a particular peer group identifier 224-1. Once the policy update 226-1-x is aggregated into the policy data 226-1, the dependencies module 212 may reference a policy data schema and detect that the new policy update 226-1-x includes terms, attributes or rules that have a downstream impact on the implementation of terms, attributes or rules of other previously aggregated policy updates ("dependent policy updates"). However, no organization has yet to provide policy updates for the dependent policy updates. In one embodiment, the dependencies module 212 may flag the policy update 226-1-x to not be pushed out until all the other terms, attributes or rules of the dependent policy updates have been sufficiently updated or verified as being most current. In another embodiment, the dependencies module 212 may flag the policy update 226-1-x to be pushed out to other organizations with additional data indicating the terms, attributes or rules of the dependent policy updates that will be affected by the policy update 226-1-x.

The opt-in module 206 allows an organization that subscribes to the PDE 200 to select how or if its policy updates will be used. Each policy may have 2 core attributes, e.g., (1) dynamic or static and (2) public or private. For example, if an organization has opted-in for dynamic policies via the opt-in module 206, then then PDE 200 may automatically push policy updates to the organization, whereby the pushed policy updates reflect changes in the anonymized and aggregated data of an organizational peer group that corresponds with the organization—or has been selected by the organization. This will help keep the organization in compliance with industry accepted best-practices and changing governmental regulations without having to manage the burden and constraints experienced with conventional approaches to updating internal organizational data protection policies.

If an organization has opted-in for static policies, then the organization's various policies will not be modified by the PDE 200—unless the organization sends the PDE 200 a specific request for a type of policy update. If an organization has selected private mode via the opt-in module 206, then policy updates from the organization will not be shared with other organizations, however, this will not interfere the with organization receiving policy updates from the PDE 200. If an organization has selected public mode via the opt-in module 206, then policy updates sent to the PDE 200 from the organization may be included in the PDE's anonymized and aggregated data 226-1 . . . 226-n and be available to be pushed out to other organizations.

As also illustrated in FIG. 2, a policy cross-reference module 210 may track policy updates submitted by an organization that fall under different peer group identifiers 224-1 . . . 224-n. For example, as discussed above, an organization may submit a policy update related to an industry code 220-1 . . . 220-n that maps to an organization list 222-1 . . . 222-n that doesn't include that organization. However, that same organization may also transmit policy update submissions to the PDE 200 related to an industry code 220-1 . . . 220-n that does map to organization list 222-1 . . . 222-n in which the organization is listed. The result may be that the PDE 200 has stored anonymized policy update data from multiple policy updates from the organization, but only some of anonymized policy update data will be indirectly attributed to the organization by way of that organization being listed in an organization list. The policy cross-reference module 210 generates a mapping between anonymized policy update data and each organization that submitted the policy update. In one embodiment, the policy cross-reference module 210 may be able to determine that a particular organization's activity with the PDE 200 more generally seems to deal with policy issues that fall outside of its official industry sector. In this case, the policy cross-reference module 210 may trigger the PDE 200 to offer the particular organization to be listed as an organization in a different organization list with a peer group identifier that corresponds to an industry code that is different than the particular organization's current industry code. This will ensure that the particular organization receives policy updates that are related and relevant to its submissions to the PDE 200.

An organization may have multiple data protection systems that reside in various geographic locations, such as, for example: Germany, Europe, North American, etc. Each country may have different regulations that will affect one or more data protection policies attributes, such as different legally required data retention time lengths (e.g. –5 years, 7 years). This requires the PDE 200 to provide policy updates that are geographically aware. When data is transmitted from an organization to the PDE 200, the transmitted data may also identify one or more data protection system locations. Inclusion of this location data is dependent upon an organization selecting to opt-in to provide location data to the PDE 200 for use by the policy-regulation mapping module 202.

For example, a serial number may be sent to the PDE 200 by an organization. The policy-regulation mapping module 202 maps each serial number to one or more physical locations where the computing system that is the subject of the organization's submission is located. This allows policies and policy updates to be localized to according to geographic compliance zones. The policy-regulation mapping module 202 thereby provides the PDE 200 the ability to generate sets of policies (or policy updates) both with and without the geographic compliance zones constraints. For an organization's computing system that is not geo-constrained, the policy-regulation mapping module 202 will use all of the policy data 226-1, for example—for a given peer group identifier 224-1 that map's to an organization list 222-1 that includes the organization—to compute a set of policies that can be pushed (i.e. published) to the non-geo-constrained computing system. For a geo-constrained computing system of the organization, only policy 226-1 data than be reconciled with the geo-constrained computing system's location will be used to compute the resultant data policy set.

FIG. 2 further shows a communication module 208 through which the PDE 200 receives data from one or more external computing systems of various organization and also transmits policies and policy updates to those external computing systems. The PDE 200 also includes an organization number threshold module 214 to determine whether an organization list 222-1 . . . 222-n includes a pre-defined threshold number of different organizations. If the threshold module 214 determines that a respective organization list 222-n does meet the pre-defined threshold number of different organizations, then the policy data 226-n that maps to peer group identifier 224-n of the respective organization list 222-n is valid for being shared to other organizations. However, if the pre-defined threshold number of different organizations is not met, this indicates that there is not yet a critical amount of policy data 226-n that can be deemed as adequately reflecting the policy update needs of the corresponding industry sector.

Figure 3:
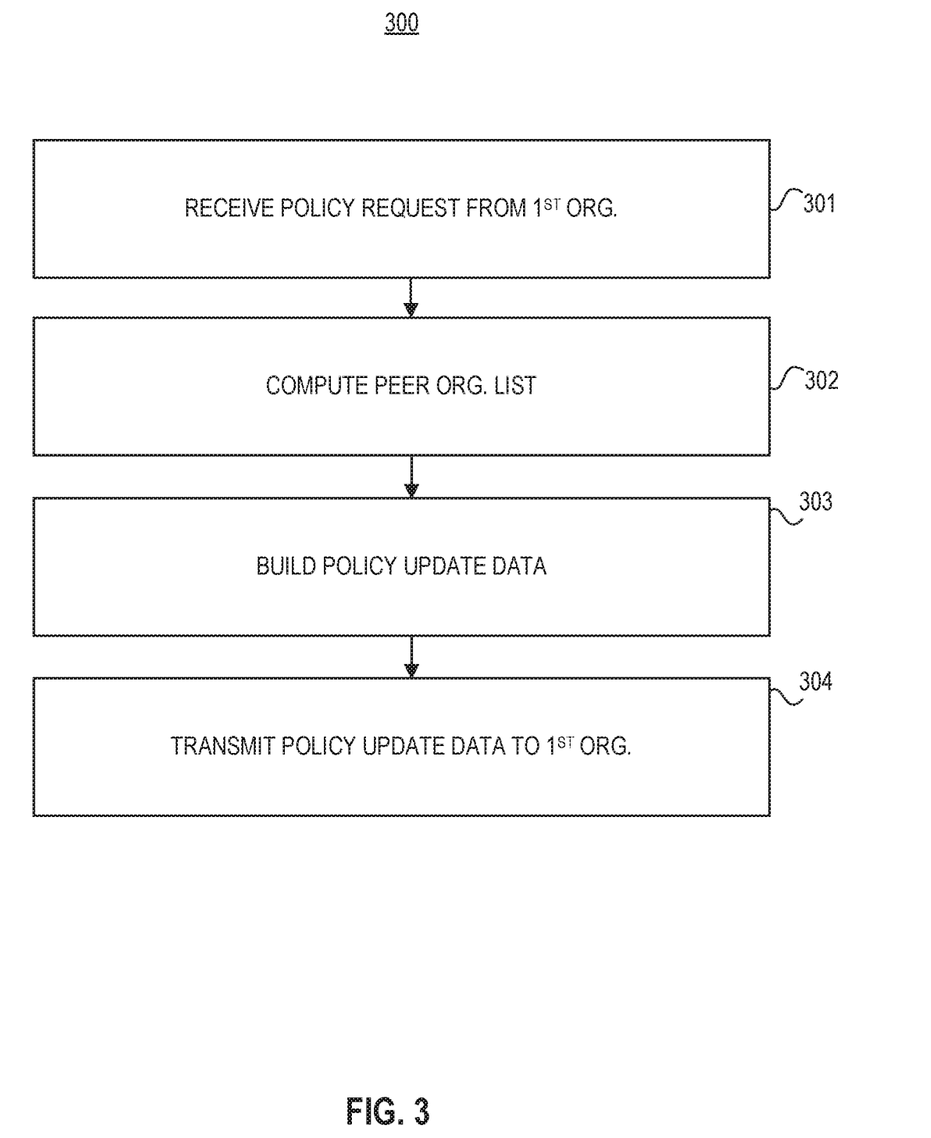
FIG. 3 is a flow diagram illustrating an example method for a Policy Derivation Engine (PDE) that updates and manages data protection policies based on external policy updates from one or more other organizations that share the same organizational peer group according to one or more embodiments of the disclosure.

FIG. 3 is a flow diagram illustrating an example method 300 for a Policy Derivation Engine (PDE) that updates and manages data protection policies based on external policy updates from one or more other organizations that share the same organizational peer group according to one or more embodiments of the disclosure.

At step 301, the PDE receives a policy request from a first computing system associated with a first organization. For example, a request may be received by the PDE from the first organization for one or more data protection policies or one or more data protection policy updates. The request from the first organization may include the first organization's industry identifier, such as a 5 to 6-digit NAISC code. In the context of the NAICS code, the first 2 digits of the code define the high-level industry of a respective organization, such as "22" for Utility companies and "52" for Finance and Insurance companies. The subsequent digits after the first 2 digits further help to qualify the respective organization's industry sector at a more granular level. That is, for example, after a two-digit prefix of "52," the next few digits may represent a sub-industry sector. For example, 522120 for Saving Institutions and 522130 for Credit Unions, where the numeric strings of "2120" and "2130" after the "52" prefix are pre-defined to represent the sub-industry sectors within the high-level Finance and Insurance industry classification. The policy request may be a request to update a policy of the first organization with regard to one or more policy attributes that are currently deployed by other peer organizations. Such policy attributes may include, but are not limited to: RPO, RTO, bandwidth time-of-use, target storage type (deduplicated, long-term archival), replication (number of copies, distance between replicas), retention period, data source type (virtual machine, database, file server), importance of data policy source, filtering rules (i.e. distinguishing between "prod," "dev," and "test" files) and cost. It is understood that, according to one or more embodiments, the first organization may have selected an industry identification code to be part of the policy request received at the PDE 200. The selected industry identification code may map to an actual industry sector of the first organization or may map to an industry sector that is unrelated to the actual industry sector of the first organization.

At step 302, the PDE computes a list of peer organizations of the first organization. Organizational peer groups (i.e. an organization list associated with a peer group identifier) may be defined by using the smallest range of NAICS codes around the received NAICS code so as to determine an organization list for a peer group identifier that has a minimal threshold number (e.g., ~100) of organizations that share an industry classification or sub-industry classification. For example, if the PDE cannot compute an organization list that includes at least the minimal threshold number of organizations that each share the same 6-digit NAICS code, then the PDE truncates the received NAISC code down to the first 4 digits (for example) and then attempts to compute an organization list that includes at least the minimal threshold number of organizations that each share the same 4-digits. The PDE may continue in this computation loop until an organization list that meets the minimal threshold number is computed.

At step 303, the PDE builds policy update data based on respective policy data received from one or more peer organizations. For example, the PDE may build policy data based on the policies, policy updates, policy templates, values, attributes, rules and instructions received from the peer organizations in the recently computed peer organization list. For example, building the policy data may at least include anonymizing and aggregating the policy data as described above.

At step 304, the PDE transmits at least a portion of policy update data to the first computing system associated with the first organization. For example, the PDE may select a portion of the policy data that matches they type of policy data being requested by the first organization. The PDE pushes an instance of the matching policy data to the computing system(s) of the first organization.

As noted, the operations (or steps) shown in the above processes are not necessarily performed in the order indicated and may be performed in parallel, as a single operation, or as multiple operations.

Figure 4:
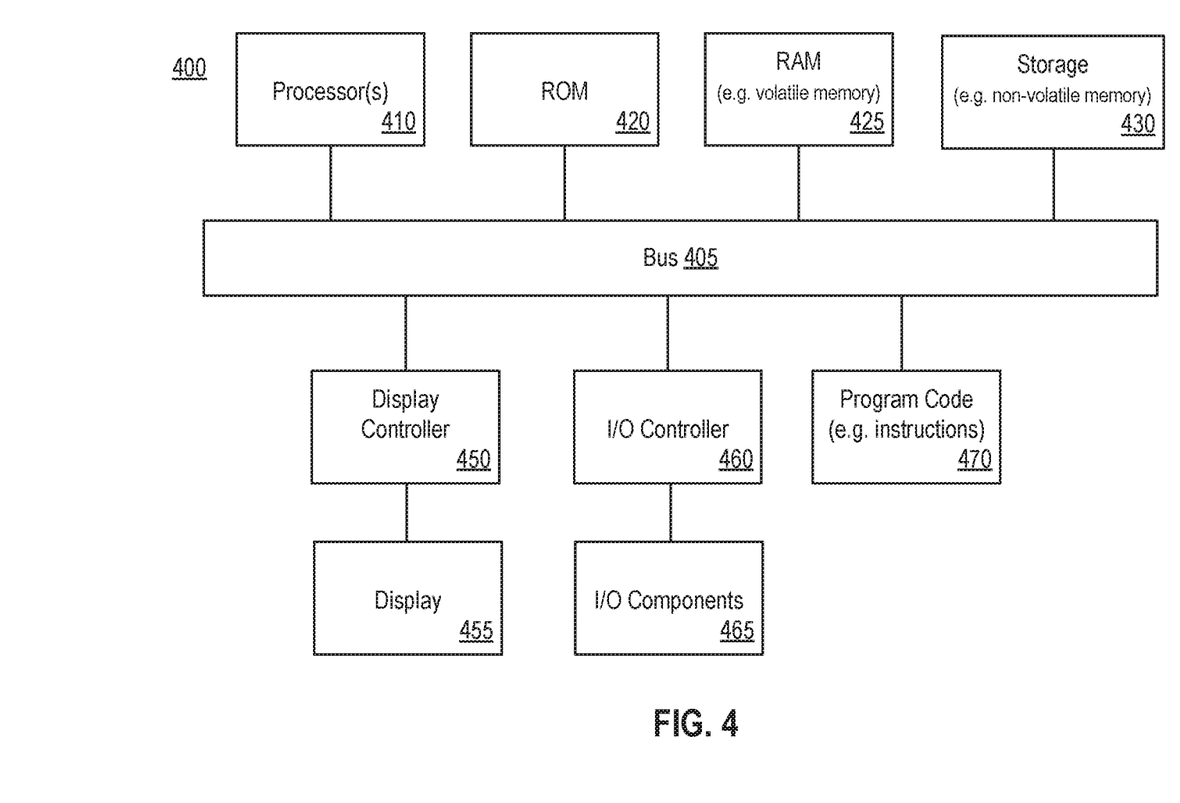
FIG. 4 is a block diagram illustrating an example of a computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. clustered storage system 180, node 212, CWB 206, CSP 210, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. clustered storage system 180, node 212, CWB 206, CSP 210, etc.). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   receive policy data from a plurality of organizations;
   receive a policy request from a first computing system associated with a first organization, the policy request including an industry classification code selected by the first organization;
   compute a list of peer organizations of the first organization from the plurality of organizations, one or more of the peer organizations having provided updated policy data after the receiving the policy data, wherein the list of peer organizations of the first organization includes an identification of one or more organizations associated with an industry classification code that is similar to the received industry classification code selected by the first organization;
   build policy update data based on the updated policy data in response to receiving the policy request; and
   transmit at least a portion of policy update data to the first computing system associated with the first organization.

2. The system of claim 1, wherein the plurality of instructions, when executed, further cause the one or more processors to:
   transmit, to the first computing system associated with the first organization, an update to at least an anonymized portion of a data protection policy deployed at least one of the peer organizations, wherein each peer organization is associated with an industry code similar to an industry code received in the policy request, wherein the industry code received in the policy request maps to an industry sector that is different than an actual industry sector of the first organization.

3. The system of claim 1, wherein the plurality of instructions, when executed, further cause the one or more processors to:
   anonymize and aggregate the respective policy data received from the peer organizations.

4. The system of claim 1, wherein the plurality of instructions, when executed, further cause the one or more processors to:
   truncate the received industry classification code selected by the first organization; and
   identify one or more organizations that are associated with the truncated industry classification code.

5. The system of claim 1, wherein the plurality of instructions, when executed, further cause the one or more processors to:
   verify that a number of peer organizations meets a required threshold minimum number of organizations.

6. A method comprising:
   receiving policy data from a plurality of organizations;
   receiving a policy request from a first computing system associated with a first organization, the policy request including an industry classification code selected by the first organization;
   computing a list of peer organizations of the first organization from the plurality of organizations, one or more of the peer organizations having provided updated policy data after the receiving the policy data, wherein the list of peer organizations of the first organization includes an identification of one or more organizations associated with an industry classification code that is similar to the received industry classification code selected by the first organization;

building policy update data based on the updated policy data in response to receiving the policy request; and transmitting at least a portion of policy update data to the first computing system associated with the first organization.

7. The method as in claim 6, wherein transmitting at least a portion of policy update data to the first computing system associated with the first organization includes:

transmitting, to the first computing system associated with the first organization, an update to at least an anonymized portion of a data protection policy deployed at least one of the peer organizations, wherein each peer organization is associated with an industry code similar to an industry code received in the policy request, wherein the industry code received in the policy request maps to an industry sector that is different than an actual industry sector of the first organization.

8. The method as in claim 6, wherein building policy update data based on respective policy data received from one or more peer organizations comprises:

anonymizing and aggregating the respective policy data received from the peer organizations.

9. The method as in claim 6, wherein identifying one or more organizations that are associated with an industry classification code that is similar to the received industry classification code selected by the first organization:

truncating the received industry classification code selected by the first organization; and identifying one or more organizations that are associated with the truncated industry classification code.

10. The method as in claim 6, wherein computing a list of peer organizations of the first organization:

verifying that a number of peer organizations meets a required threshold minimum number of organizations.

11. A computer program product comprising a non-transitory computer-readable medium having a computer-readable program code embodied therein to be executed by one or more processors, the program code including instructions to:

receive policy data from a plurality of organizations;

receive a policy request from a first computing system associated with a first organization, the policy request including an industry classification code selected by the first organization;

compute a list of peer organizations of the first organization from the plurality of organizations, one or more of the peer organizations having provided updated policy data after the receiving the policy data, wherein the list of peer organizations of the first organization includes an identification of one or more organizations associated with an industry classification code that is similar to the received industry classification code selected by the first organization;

build policy update data based on the updated policy data in response to receiving the policy request; and transmit at least a portion of policy update data to the first computing system associated with the first organization.

12. The computer program product as in claim 11, wherein the program code to transmit at least a portion of policy update data to the first computing system associated with the first organization further includes program code to:

transmit, to the first computing system associated with the first organization, an update to at least an anonymized portion of a data protection policy deployed at least one of the peer organizations, wherein each peer organization is associated with an industry code similar to an industry code received in the policy request, wherein the industry code received in the policy request maps to an industry sector that is different than an actual industry sector of the first organization.

13. The computer program product as in claim 11, wherein the program code includes further instructions to:

anonymize and aggregate the respective policy data received from the peer organizations.

14. The computer program product as in claim 11, wherein the program code to identify one or more organizations that are associated with an industry classification code that is similar to the received industry classification code selected by the first organization further includes program code to:

truncate the received industry classification code selected by the first organization;

identify one or more organizations that are associated with the truncated industry classification code; and verify that a number of peer organizations that are associated with the truncated industry classification code meets a required threshold minimum number of organizations.

\* \* \* \* \*